(12) United States Patent
Thyagaturu et al.

(10) Patent No.: US 12,483,515 B2
(45) Date of Patent: Nov. 25, 2025

(54) APPLICATION-TO-APPLICATION RESOURCE RESERVATION SCHEMES FOR PRECISION NETWORKING

(71) Applicant: Intel Corporation, Santa Clara, CA (US)

(72) Inventors: Akhilesh S. Thyagaturu, Tempe, AZ (US); Vinodh Gopal, Westborough, MA (US); Patrick J. Hart, Milwaukie, OR (US); Christin Fenter, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 990 days.

(21) Appl. No.: 17/179,249

(22) Filed: Feb. 18, 2021

(65) Prior Publication Data

US 2022/0263770 A1    Aug. 18, 2022

(51) Int. Cl.
*H04L 47/72* (2022.01)
*G06F 9/455* (2018.01)
(Continued)

(52) U.S. Cl.
CPC .......... *H04L 47/72* (2013.01); *G06F 9/45558* (2013.01); *H04L 43/0852* (2013.01);
(Continued)

(58) Field of Classification Search
CPC ....... G06F 2009/45595; G06F 9/45558; H04L 47/72; H04L 47/762; H04L 47/781; H04L 45/38; H04L 43/0852
See application file for complete search history.

(56) References Cited

U.S. PATENT DOCUMENTS

| | | | |
|---|---|---|---|
| 7,636,302 B2 * | 12/2009 | Tyagi | H04L 47/822 370/395.2 |
| 8,619,779 B2 * | 12/2013 | Li | H04L 45/54 370/392 |

(Continued)

OTHER PUBLICATIONS

International Search Report and Written Opinion for PCT Patent Application No. PCT/US22/12580, Mailed May 6, 2022, 12 pages.

*Primary Examiner* — Jenee Holland
(74) *Attorney, Agent, or Firm* — Compass IP Law PC

(57) ABSTRACT

Methods and apparatus for application-to-application resource reservation schemes for precision networking. Hardware resources, such as interconnects and processing resources, are reserved for forwarding and processing data along flow paths for end-to-end delivery of data between applications running on respective platforms communicating over a network. Operating system and/or hypervisor resources are also reserved. The reservations may be based per application, per virtual machine (VM), or per container, and reservations for multiple applications/VMs/containers are supported. The interconnects include chip-to-chip, socket-to-socket (for multi-socket platforms), and die-to-die interconnects. Reservations for on-chip fabrics are also supported. Under one approach, an orchestrator is used to manage resources reservations by sending resources reservation requests to a platform's operating system or hypervisor, with the operating system/hypervisor configuring the platform hardware resources to effect based on the reserved resources. The method and apparatus may be used to implement flow paths having deterministic latencies and/or meet SLA QoS requirements.

19 Claims, 11 Drawing Sheets

(51) Int. Cl.
  *H04L 43/0852*  (2022.01)
  *H04L 45/00*    (2022.01)
  *H04L 47/762*   (2022.01)
  *H04L 47/78*    (2022.01)

(52) U.S. Cl.
  CPC ............ *H04L 45/38* (2013.01); *H04L 47/762* (2013.01); *H04L 47/781* (2013.01); *G06F 2009/45595* (2013.01)

(56) References Cited

U.S. PATENT DOCUMENTS

| | | | | |
|---|---|---|---|---|
| 8,705,513 | B2* | 4/2014 | Van Der Merwe | H04L 47/72 370/392 |
| 8,856,319 | B1* | 10/2014 | Huang | H04L 47/70 709/224 |
| 8,943,260 | B2* | 1/2015 | Ben-Yehuda | G06F 9/5077 711/170 |
| 9,336,042 | B1* | 5/2016 | Brenneman | G06F 9/5088 |
| 9,619,261 | B2* | 4/2017 | Gaurav | G06F 9/505 |
| 10,187,323 | B2* | 1/2019 | Laplanche | G06F 9/5072 |
| 10,198,288 | B2* | 2/2019 | Tasoulas | G06F 9/4856 |
| 10,693,806 | B2* | 6/2020 | Su | H04L 41/5025 |
| 10,721,290 | B2* | 7/2020 | Gill | H04L 67/10 |
| 11,194,753 | B2* | 12/2021 | Marolia | G06N 3/08 |
| 11,269,669 | B2* | 3/2022 | Chou | G06F 3/0664 |
| 11,556,436 | B2* | 1/2023 | Deval | G06F 13/1668 |
| 11,809,338 | B2* | 11/2023 | Bernat | G06F 12/0822 |
| 12,113,853 | B2* | 10/2024 | Guim Bernat | H04L 41/5051 |
| 12,254,339 | B2* | 3/2025 | Worsley | G06F 9/45558 |
| 2006/0083238 | A1* | 4/2006 | Lee | H04L 47/726 370/389 |
| 2007/0211638 | A1* | 9/2007 | Lee | H04L 45/125 370/329 |
| 2009/0217020 | A1* | 8/2009 | Yourst | G06F 9/3851 712/E9.004 |
| 2013/0031233 | A1* | 1/2013 | Feng | G06F 9/06 709/223 |
| 2013/0160008 | A1* | 6/2013 | Cawlfield | G06F 9/45558 718/1 |
| 2013/0325998 | A1* | 12/2013 | Hormuth | H04L 41/06 709/212 |
| 2013/0339568 | A1* | 12/2013 | Corrie | G06F 9/45558 711/6 |
| 2014/0089725 | A1* | 3/2014 | Ackaret | G11B 20/1883 711/171 |
| 2014/0137104 | A1* | 5/2014 | Nelson | G06F 9/45558 718/1 |
| 2014/0281026 | A1* | 9/2014 | Guo | H04L 45/00 709/240 |
| 2015/0215577 | A1* | 7/2015 | Ramachandran | H04W 28/0215 348/14.02 |
| 2015/0319231 | A1* | 11/2015 | Naouri | H04L 67/1001 709/204 |
| 2015/0358290 | A1 | 12/2015 | Jain et al. | |
| 2016/0248703 | A1 | 8/2016 | Gopalakrishnan et al. | |
| 2017/0046144 | A1* | 2/2017 | Chen | G06F 8/60 |
| 2018/0004539 | A1* | 1/2018 | Liguori | G06F 9/45558 |
| 2018/0004703 | A1* | 1/2018 | Sharma | G06F 13/4072 |
| 2018/0067682 | A1* | 3/2018 | Sofia | G06F 9/5016 |
| 2018/0114013 | A1* | 4/2018 | Sood | G06F 21/606 |
| 2018/0165111 | A1* | 6/2018 | Feng | G06F 9/505 |
| 2018/0335968 | A1* | 11/2018 | Pauley | G06F 3/068 |
| 2019/0042434 | A1* | 2/2019 | Gough | H04L 49/70 |
| 2019/0179530 | A1* | 6/2019 | Chen | G06F 3/0631 |
| 2019/0188022 | A1* | 6/2019 | Jung | G06F 9/45558 |
| 2019/0303305 | A1* | 10/2019 | Mesropian | G06F 21/44 |
| 2020/0004685 | A1 | 1/2020 | Bernat et al. | |
| 2020/0089517 | A1* | 3/2020 | Paul | G06F 9/48 |
| 2020/0150993 | A1 | 5/2020 | Krakirian et al. | |
| 2020/0183714 | A1* | 6/2020 | Wang | H04L 41/40 |
| 2021/0006511 | A1 | 1/2021 | Uminski et al. | |
| 2022/0103487 | A1* | 3/2022 | Ang | H04L 45/38 |
| 2022/0182332 | A1* | 6/2022 | Christofi | H04L 47/803 |
| 2022/0200912 | A1* | 6/2022 | Bataineh | H04L 47/20 |
| 2022/0200954 | A1* | 6/2022 | Divekar | H04L 47/85 |
| 2022/0247696 | A1* | 8/2022 | He | H04L 47/34 |
| 2022/0335009 | A1* | 10/2022 | Paul | G06F 16/11 |
| 2022/0368771 | A1* | 11/2022 | Hunt | H04L 67/10 |
| 2024/0080759 | A1* | 3/2024 | Gupta | H04W 24/02 |
| 2024/0121186 | A1* | 4/2024 | Brar | G06F 9/5077 |
| 2024/0348541 | A1* | 10/2024 | Brar | G06F 9/5077 |
| 2025/0173177 | A1* | 5/2025 | Baransi | G06F 9/45558 |

* cited by examiner

APPLICATION-TO-APPLICATION RESOURCE RESERVATION SCHEMES FOR PRECISION NETWORKING

BACKGROUND INFORMATION

As illustrated in FIG. 1, end-to-end network reservations in traditional methods has been limited to NIC to NIC, where the network path between the NIC (Network Interface Controller) of either end of the network can provide the strict Quality of Service (QoS) requirements. Meanwhile, the system characteristics that processes the packets largely operates in best effort manner with no strict reservations in computing and data transfers within the system. We collectively refer to "the system" for operating system (OS)/Hypervisor and hardware platforms.

The current state-of-the-art networking mechanisms fail to address the reservations within the OS and platform, which adds uncertainty in the "mission-critical" precision networking systems. The non-deterministic variations in the processing delays as well as interconnect saturations results in overprovisioning of resources to avoid compromising of applications' QoS.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
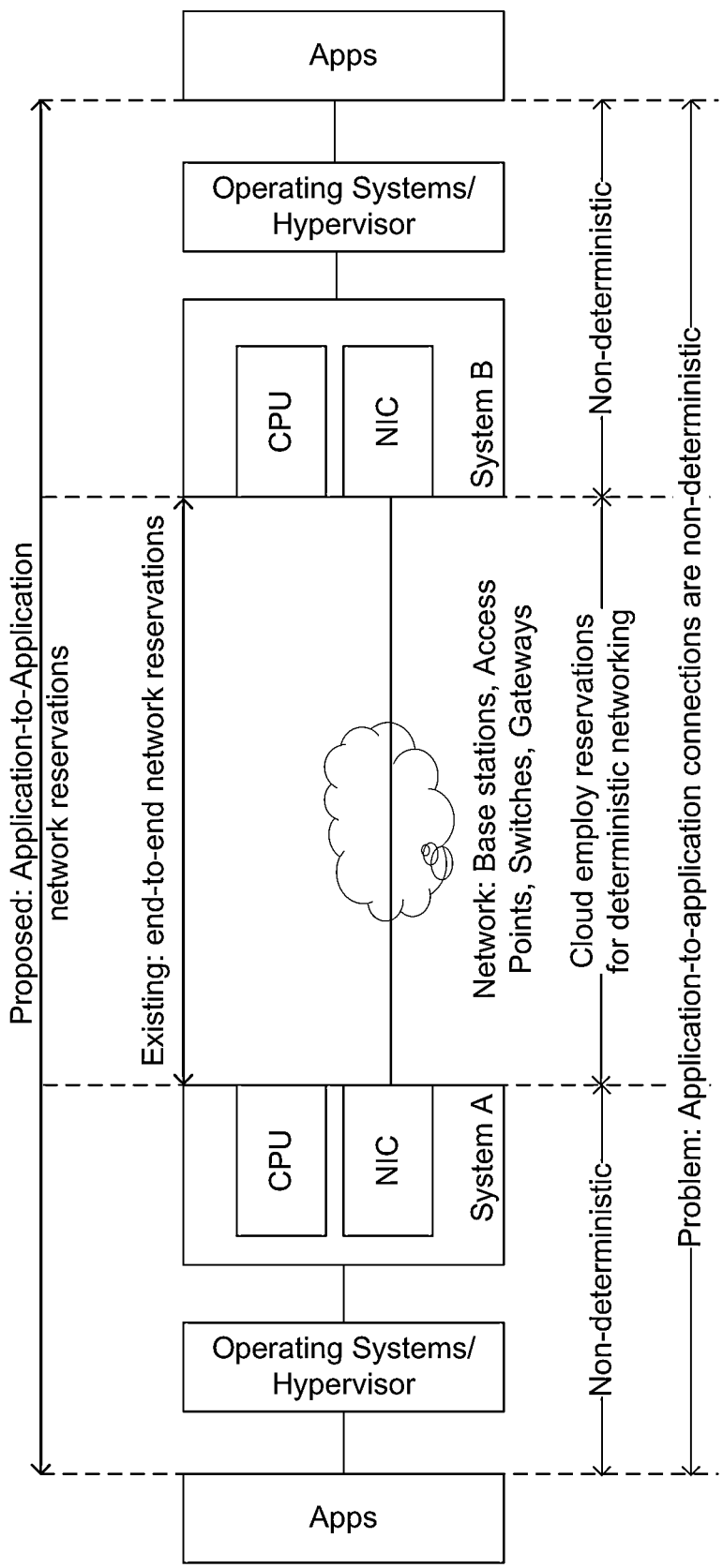
FIG. 1 is a diagram illustrating problems addressed by embodiments disclosed herein to address non-deterministic forwarding/deliver of data between applications.

Embodiments of methods and apparatus for application-to-application resource reservation schemes for precision networking are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of embodiments disclosed herein, methods and apparatus for application-to-application resource reservation schemes for precision networking are provided. The solution enables applications, Virtual Machines (VMs), and Containers to reserve the OS/Hypervisor and platform (interconnects and processing) resources for packet or data processing to achieve high precision networking with deterministic processing delay (e.g., deterministic latency).

Under conventional approaches, when a packet is forwarded through a platform to reach an application, the data traverses through several interconnects, Systems on a Chip (SoCs), OS and hypervisor abstraction methods. These resources are commonly shared by all (or multiple) applications, as there are no interconnect reservation mechanisms. For instance, Intel® On-Chip System Fabric (IOSF) and ARM'S® Advance eXtensible Interface transport the packets in an aggregation mode that cannot enforce strict QoS, especially across multiple hardware components. To this end, embodiments disclosed herein provide a comprehensive reservation framework to reserve cross interconnect resources as well as OS and hypervisor resources to facilitate high precision packet processing.

The embodiments provide a general framework to reserve resources on OS/Hypervisor and platforms. Aspects of the framework include:

1. In a cloud/data-center setting, an end-to-end framework for an orchestrator or the like to dynamically request (on-demand) for the system resource reservations to meet demands of cloud-native applications, VMs, and containers in an application-to-application manner.
2. In an ad hoc usage of systems, an Application Programming Interface (API) for the applications to request for reservations from OS and platform(s) before initiating the network flow (IP connections).
3. Cross-interconnect reservations to meet the requirements spanning from core (that runs the processes and threads of applications) to NIC (that transmits the packets out of network links).
4. A software component in the OS and hypervisor, i) that interacts with the orchestrator; ii) performs resource evaluations across computing nodes; iii) performs scheduling; and iv) reconfigures platform resources for applications/VMs/container workloads.
5. Hardware and software resource monitoring components for platform and OS resources such as per application on-fabric interconnect bandwidth usage, tracking and reconfiguration.

Figure 2:
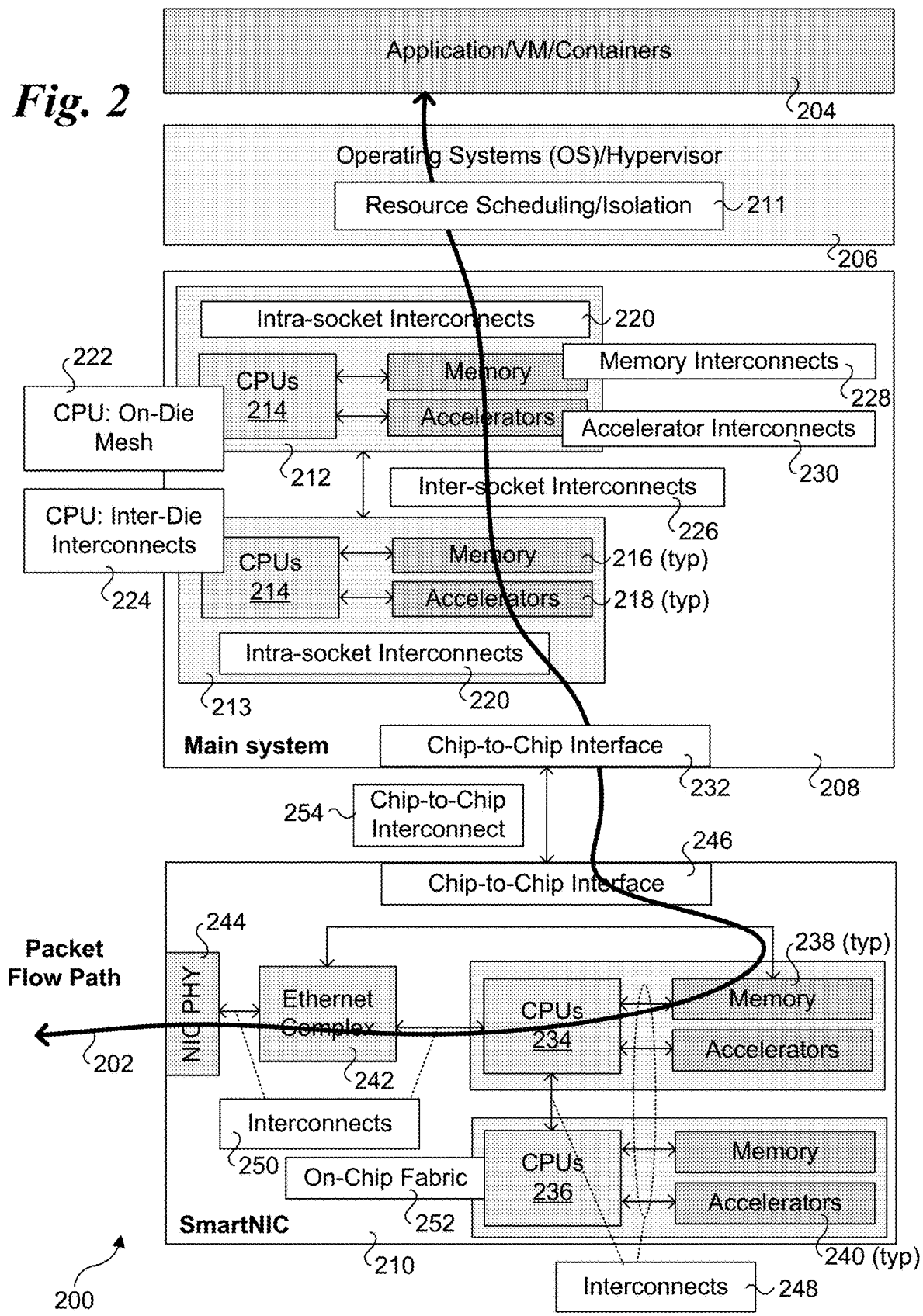
FIG. 2 is a diagram of a platform illustrating an overview of on-chip and chip-to-chip interconnects that are shared among applications without dedicated reservations.

FIG. 2 shows a platform 200 illustrating an overview of on-chip and chip-to-chip interconnects that are commonly shared among applications without dedicated reservations that impacts the overall processing of packets, such as depicted by a packet flow path 202. The top-level blocks for platform 200 include Application/VM/Containers 204, OS/hypervisor 206, main system 208, and SmartNIC 210. OS/hypervisor 206 includes a resource scheduling and isolation block 211. Main system 208 includes two sockets 212 and 213, each including CPUs 214 coupled to memory 216 and accelerators 218 and having intra-socket interconnects 220. Each CPU includes an on-die mesh 222 and inter-die interconnects 224. Main system 208 further includes inter-socket interconnects 226, memory interconnects 228, accelerator interconnects 230, and a chip-to-chip interface 232.

SmartNIC 210 includes CPUs 234 and 236 coupled to memory 238 and accelerators 240, an Ethernet complex 242, and a NIC PHY (Physical Layer) 244. The interconnectors for SmartNIC 210 include a chip-to-chip interface 246, interconnects 248 and 250, and an on-chip fabric 252. Chip-to-chip interface 246 is coupled to chip-to-chip interface 232 via a chip-to-chip interconnect 254.

Figure 3:
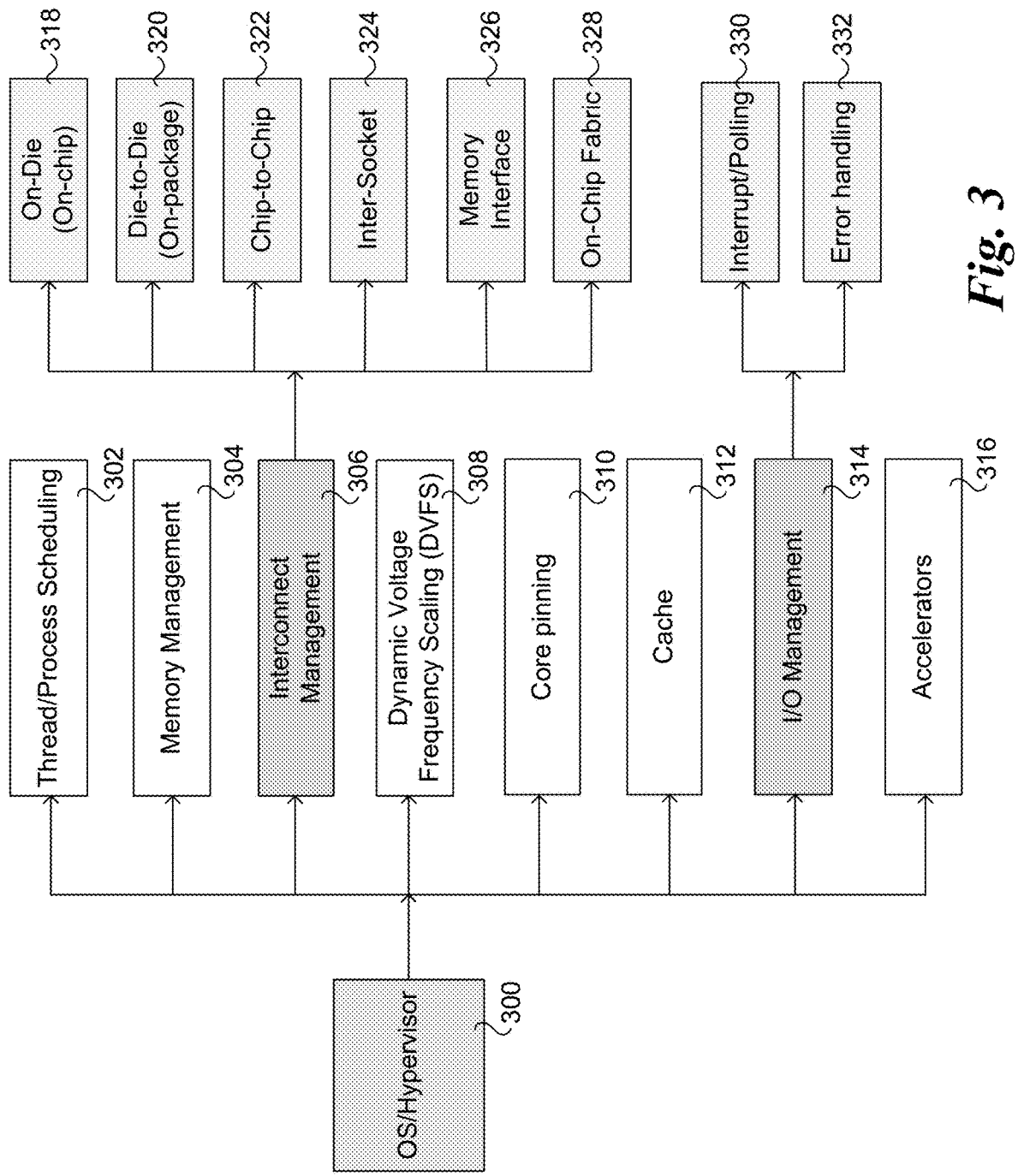
FIG. 3 is a block diagram illustrating operating system and platform components that affect application-to-application packet processing, which can be configured to achieve a high degree of precision networking.

FIG. 3 shows OS and platform components that affect application-to-application packet processing, which can be configured to achieve high degree of precision networking for mission critical connections. The components include an OS/hypervisor 300, thread/process scheduling 302, memory management 304, interconnect management 306, dynamic voltage frequency scheduling (DVFS) 308, core pinning 310, cache 312, I/O management 314, and accelerators 316. Interconnect management 306 includes on-die interconnects 318, die-to-die interconnects 320, chip-to-chip interconnect 322, inter-socket interconnect 324, memory interface 326, and on-chip fabric 328. I/O management 314 includes interrupt/polling 330 and error handling 332.

Figure 4:
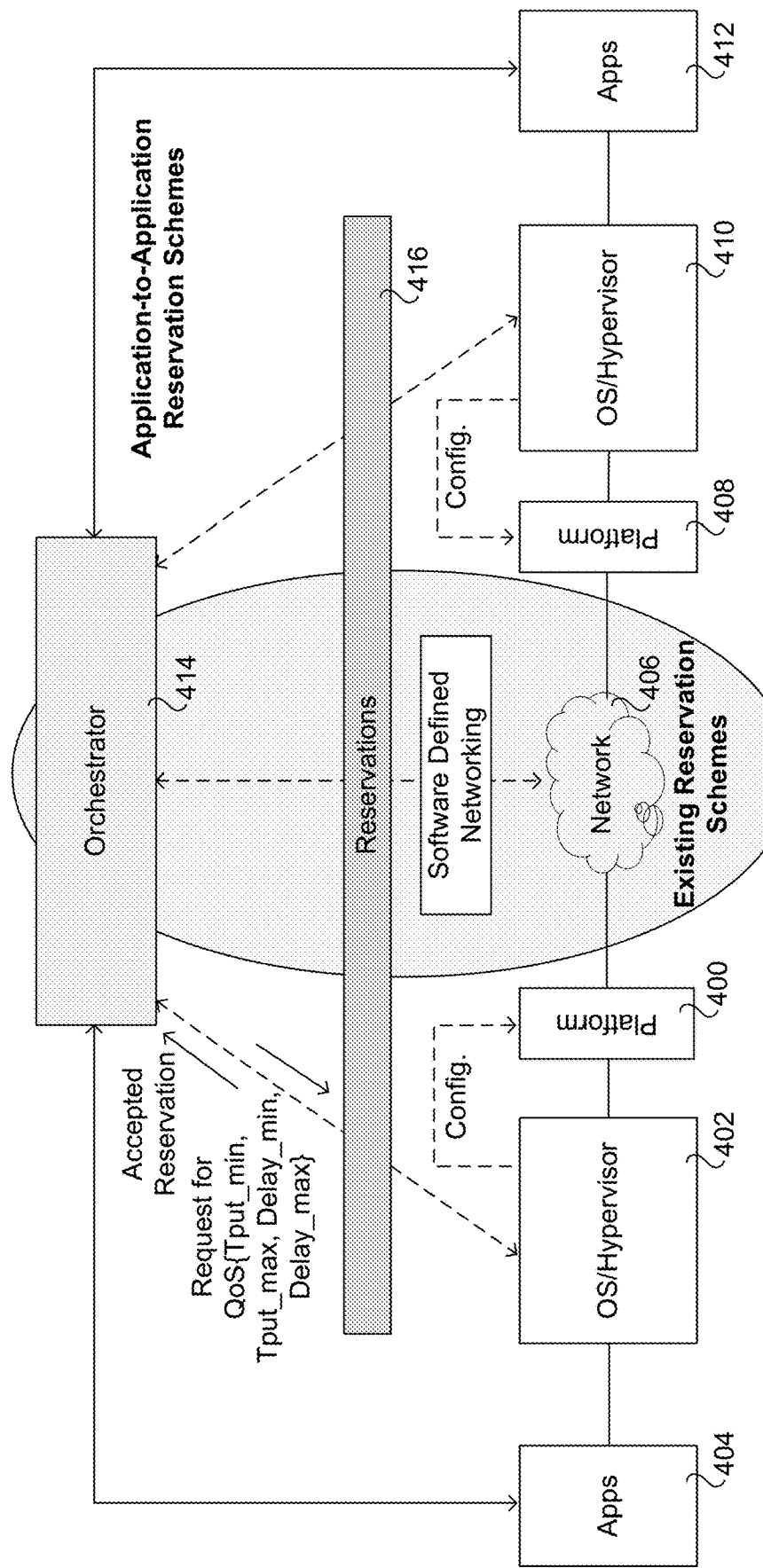
FIG. 4 is a schematic diagram illustrating an overview of some aspects of the scheduling and management components employed for implementing application-to-application reservation schemes, according to one embodiment.

Under the embodiments disclosed herein, selected interconnects in a platform are managed to support application-level scheduling of associated interconnect resources. An overview illustrating some aspects the scheduling and management components are shown in FIG. 4. A first platform 400 hosting an OS/hypervisor 402 and applications 404 is coupled in communication via a network 406 to a second platform 408 hosting an OS/hypervisor 410 and applications 412. The objective is to achieve deterministic end-to-end communication between apps 404 and apps 412. The is accomplished, in part, though use of an orchestrator 414 and reservations 416.

Figure 5:
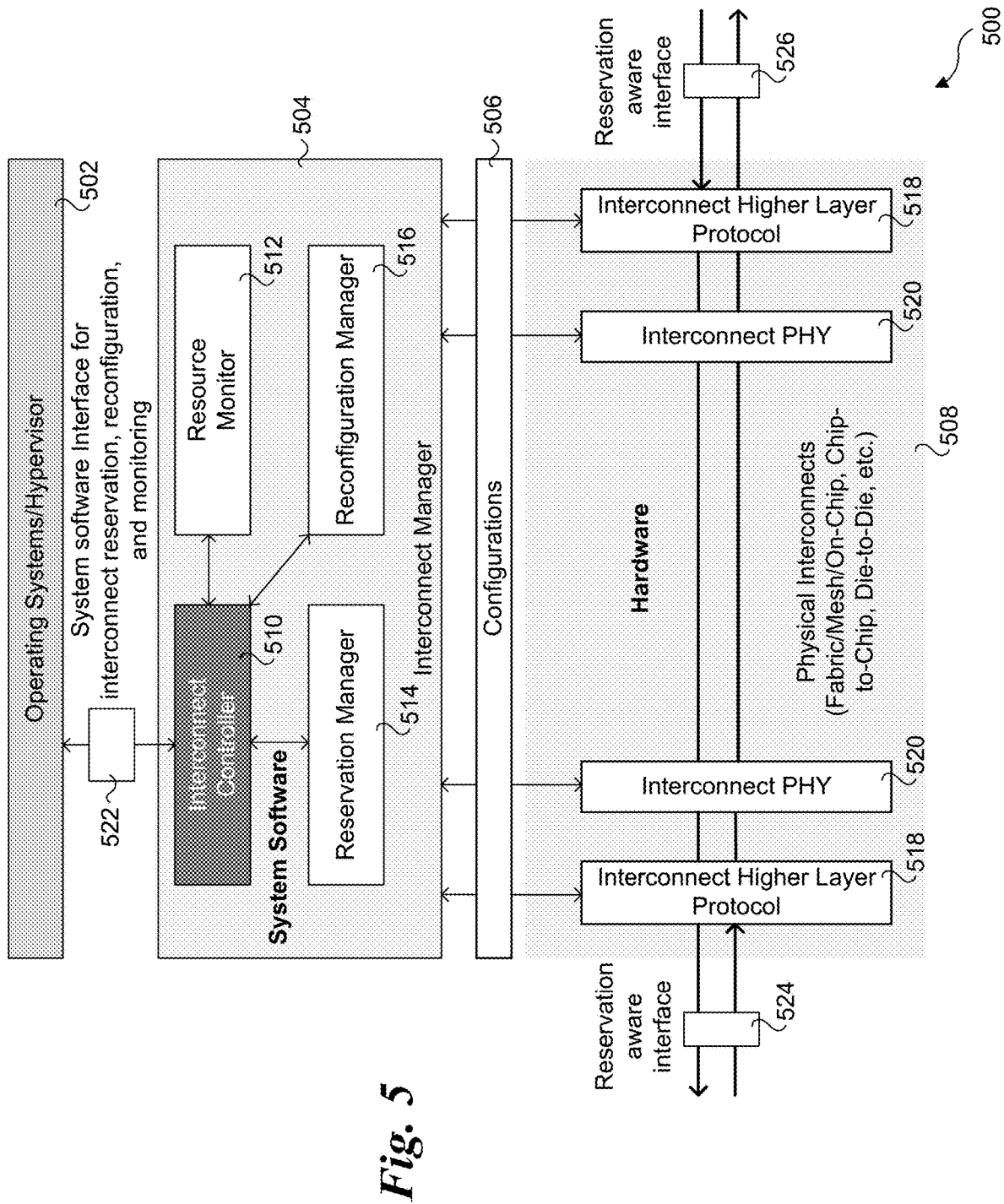
FIG. 5 is a diagram of a platform architecture illustrating hardware and software components for implementing deterministic end-to-end communication between applications, according to one embodiment.

FIG. 5 shows platform architecture 500 illustrating hardware and software components for implementing deterministic end-to-end communication between applications, according to one embodiment. The high-level blocks include an operating system/hypervisor 502, system software including an interconnect manager 504, configurations 506, and hardware 508. Interconnect manager 504 includes an interconnect controller 510, a resource monitor 512, a reservation manager 514, and a reconfiguration manager 516. Hardware 508 includes interconnect higher layer protocol 518, interconnect PHY 520. Platform architecture 500 further includes a system software interface 522 for interconnect reservation, reconfiguration, and monitoring, and reservation aware interfaces 524 and 526.

Figure 6:
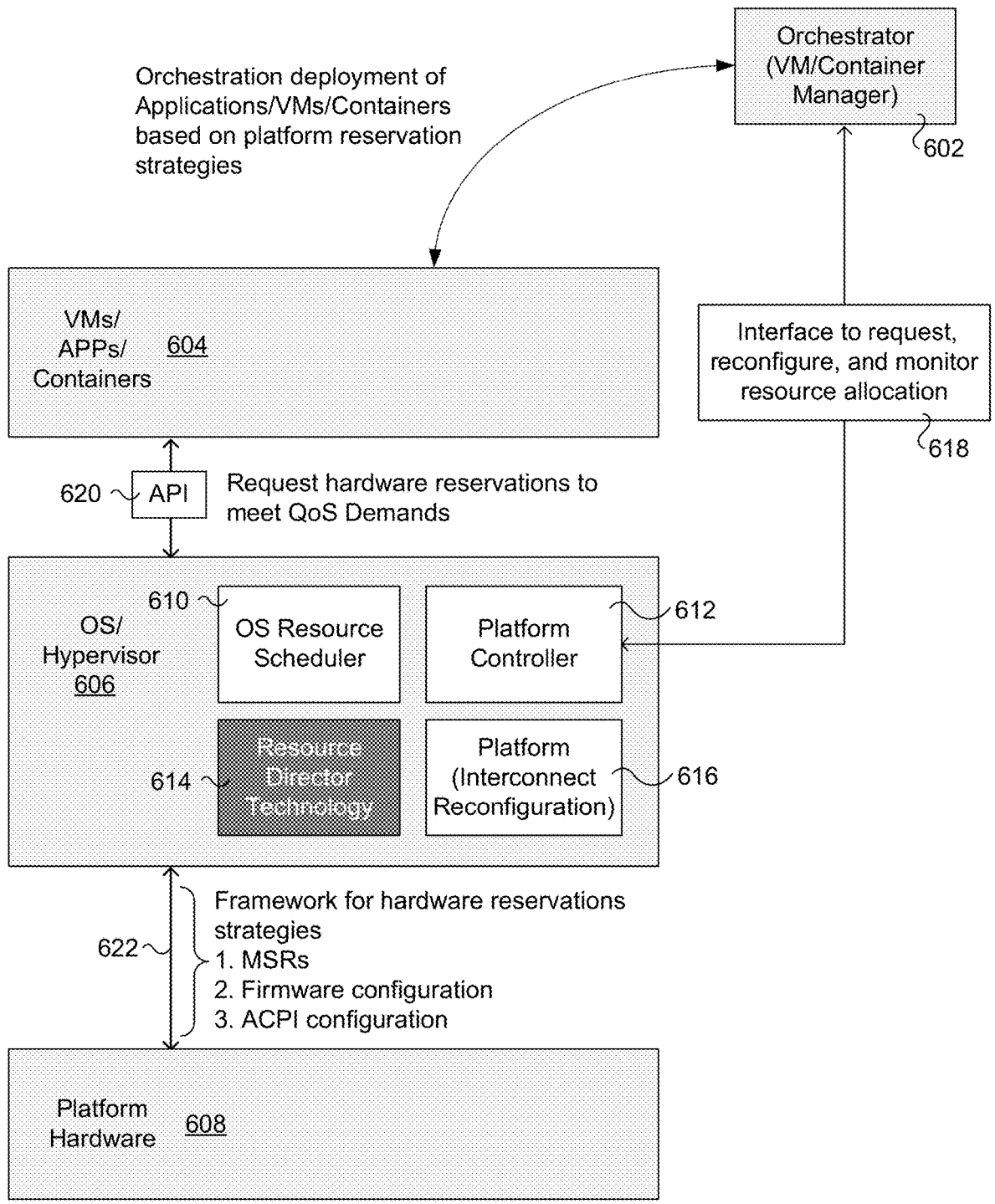
FIG. 6 is a diagram illustrating application, OS, and orchestrator interactions to evaluate the hardware resources required for applications, and reconfiguration of platform hardware to enable high precision networking, according to one embodiment.

FIG. 6 shows a diagram 600 illustrating application, OS, and orchestrator interactions to evaluate the hardware resources required for the applications, and reconfiguration of platform hardware to enable high precision networking. The components include an orchestrator 602, VMs/Apps/Containers 604, OS/hypervisor 606, and platform hardware 608. OS/hypervisor 606 includes an OS resource scheduler 610, a platform controller 612, resource director technology (RDT) 614, and platform interconnect reconfiguration 616. Platform controller 612 communicates with orchestrator 602 via an interface 618 that supports request, reconfigure, and monitor resources allocation.

An API 620 is used by VMs/Apps/Containers 604 to request hardware reservations to meet QoS demands. A framework 622 is used by OS/hypervisor 606 for hardware reservations and strategies applied to platform hardware 608. Frame 622 includes MSR (Machines Specific Registers), firmware configuration, and Advanced Configuration and Power Interface (ACPI) configuration.

The end-to-end interaction involves either, i) orchestrator requesting of hardware resource reservations for applications/VMs/containers deployment on the platform, or ii) application wanting to start a network connection, requests for resources before the connection is initiated with the socket buffer for TCP/UDP connections.

Application-to-Application Reservation Mechanism

For an application-to-application reservation, the application from a given system requests a precision connection with an application on another system through an orchestrator. The orchestrator initiates the reservation mechanism to network components such as switches and gateways, along with systems in an end-to-end connection. The systems then reserve OS and hypervisor resources as well as platform resources such as interconnects to meet the demands of the end-to-end connections.

Interconnect Design and Programmability

Figure 7:
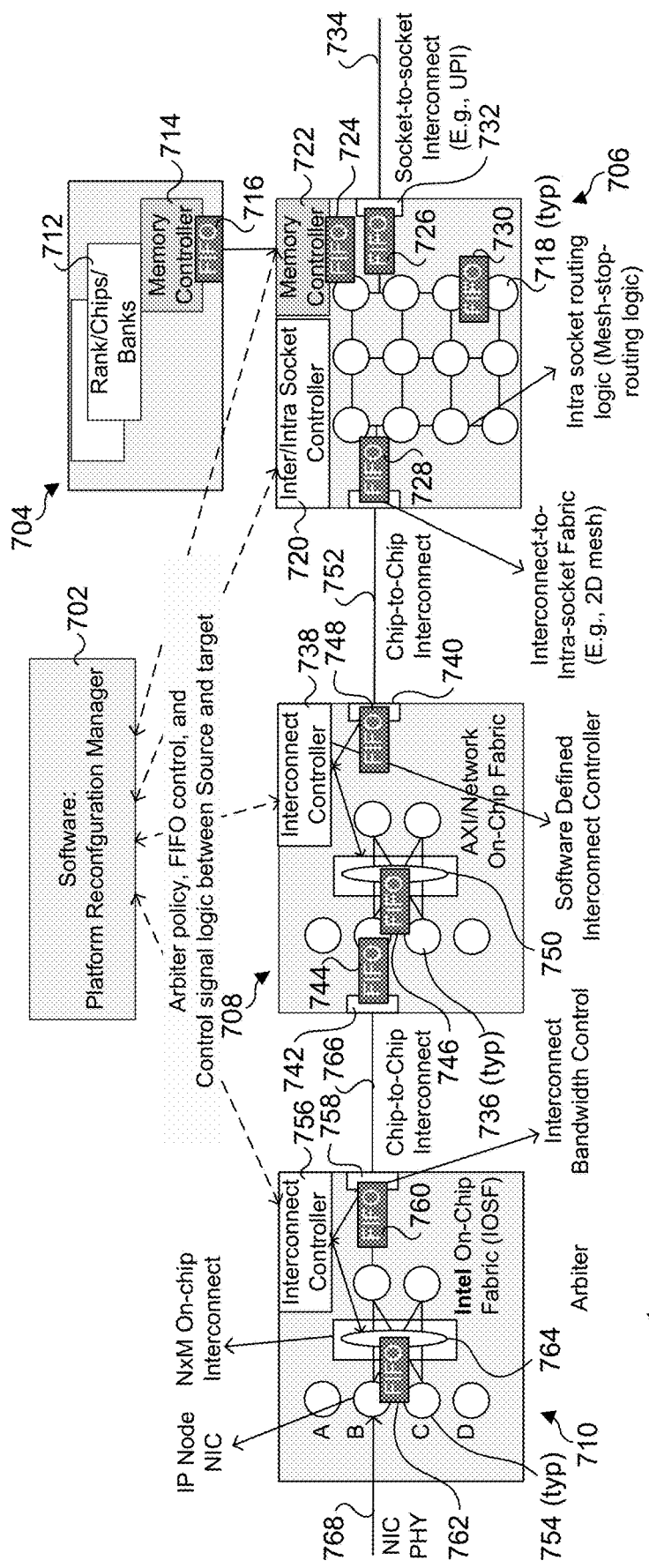
FIG. 7 is a schematic diagram illustrating communication and associated mechanisms for effecting resources reservations and configuration of interconnects and on-chip fabrics, according to one embodiment.

Aspects of interconnect design and programmability are shown in FIGS. 7-11. FIG. 7 shows a platform 700 including software comprising a platform reconfiguration manager 702, a memory subsystem 704, a CPU subsystem 706, and processor subsystems 708 and 710. Memory subsystem 704 includes a plurality of ranks/chips/banks 712 (e.g., DRAM DIMMs), a memory controller 714, and a First-in First-out (FIFO) queue 716. CPU subsystem 706 is representative of a processor System on a Chip (SoC) or the like and includes a plurality of processor cores 718 coupled via a mesh interconnect including a plurality of mesh stops and associated routing logic. The mesh interconnect may generally be implemented using any of a crossbar structure, a ring interconnect structure, a toroid interconnect structure, an any combination of similar interconnect structures known in the processor arts. CPU subsystem 706 further includes an inter/intra socket controller 712, a memory controller 722, FIFOs 724, 726, 728, and 730, and an interface 732 coupled to a socket-to-socket interconnect 734. FIFOs 724, 726, 728, and 730 are illustrative of more FIFOs that are present in the actual SoC. For example, there will typically be a FIFO for each direction on a given interface. There are also FIFOs or similar structures that are used at the mesh stops in the mesh interconnect.

Processor subsystems 708 and 710 are illustrative of various types of components/chips that may be in a system/platform with embedded processor resources. In some cases, they may be generally referred to as Other Processing Units (collectively termed XPUs), which include one or more of Graphic Processor Units (GPUs) or General Purpose GPUs (GP-GPUs), Tensor Processing Unit (TPU), Data Processor Units (DPUs), Artificial Intelligence (AI) processors or AI inference units and/or other accelerators, FPGAs and/or other programmable logic (used for compute purposes), etc. While some of the diagrams herein show the use of CPUs, this is merely exemplary and non-limiting. Generally, any type of XPU may be used in place of a CPU and/or the processing subsystems in the illustrated embodiments. Moreover, as used in the following claims, the term "processor" is used to generically cover CPUs and various forms of XPUs.

Processing subsystem 708 includes a plurality of IP (Intellectual Property) nodes 736 interconnected via an AXI/network on-chip fabric, an interconnect controller 738, I/O ports 740 and 742, and FIFOs 744, 746, and 748. Generally, there will be a FIFO for each direction for I/O port (e.g., a first FIFO for an input port and a second FIFO for the output port). The AXI/Network on-chip fabric will also include a plurality of FIFOs, only which one of which is shown (FIFO 746) for simplicity, and an arbiter 750. I/O port 740 is connected to a chip-to-chip interconnect 752.

Processing subsystem 710 includes a plurality of IP nodes 754 interconnected via an IOSF on-chip fabric, an interconnect controller 756, an I/O port 758, and FIFOs 760 and 762. As before, I/O port 758 will include a pair of FIFOs, and the IOSF will include a plurality of FIFOs at the IP nodes, only which one of which is shown (FIFO 762) for simplicity, and an arbiter 764. I/O port 758 is connected to a chip-to-chip interconnect 766. Processing subsystem 710 is also connected to a NIC PHY via an interconnect 768.

As further illustrated, platform reconfiguration manager 702 provides various control signals and arbiter policies to interconnect controllers 738 and 756 and inter/intra socket controller 720.

Figure 8:
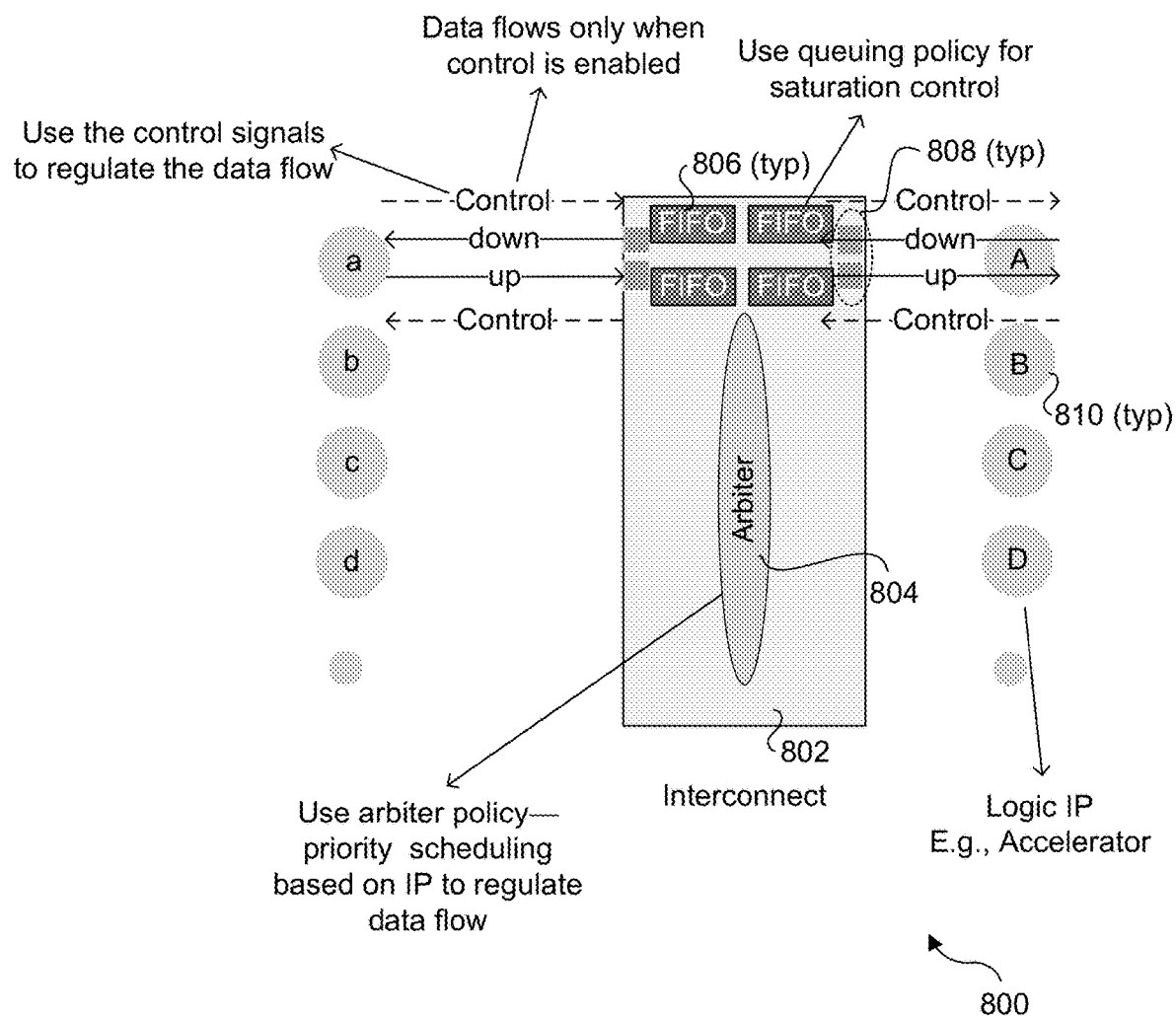
FIG. 8 is a diagram of components implemented at an interconnect to regulate data flows.

FIG. 8 shows an embodiment of a queue-based counter for monitoring mechanism 800 implemented in an interconnect 802 that includes an arbiter 804, FIFOs 806, and I/O ports 808 and a plurality of logic IPs (Intellectual Property blocks) 806. The mechanism is used to regulate data flows between IPs (Intellectual Property blocks) 810 located on opposing sides of interconnect 802. IPs 810 generally cover logic blocks or components configured to perform one of more functions, such as accelerators. Arbiter 804 is configured to implement one or more arbiter policies to effect priority scheduling based on IP to regulate data flow. Control signals are used to regulate the data flow across. In the illustrated embodiment, there is a FIFO 806 for each input port and each output port of an I/O port 808 that is used to implement a queuing policy for saturation control.

The platform reconfiguration manager computes the flow path required for the end-to-end setup at the request of an application, creates a descriptor, and sends the descriptor pointer to an interconnect controller. The flow path selects the IPs and interconnects in the path of packet flow and prepares the actions that are sent to interconnect controllers for configurations.

The interconnect controller applies the polices such as FIFO queueing, arbitration policies, and routing logic to on-chip and intra/inter socket routers, and modulated control signal to be able to control the flow between source IP and destination IPs to for end-to-end dedicated QoS. The monitoring results are updated in the system memory on the given pointer in the desc.

In addition to the interconnect structures illustrated in the Figures herein, other interconnect structures may be employed. Moreover, virtualized resources may also be reserved. For example, platforms employing one of more SR-IOV (Single Root Input/Output Virtualization) endpoints may reserve virtual or physical functions at the application, VM, or container level. An example of such an SR-IOV endpoint is a PCIe network adaptor or NIC. The forwarding paths in virtualized environments employing shared virtual or physical functions generally include a combination of software interfaces and memory buffers. Reservation and scheduling of these software interfaces and/or memory buffers may be implemented in a similar manner to reservation and scheduling of hardware resources.

The techniques also may be applied to shared and scalable I/O devices employing a hardware-assisted I/O virtualization. Such scalable I/O devices include but are not limited to network controllers, storage controllers, GPUs, and other hardware accelerators, which may be efficiently shared across multiple containers or virtual machines. An important aspect of these devices is "composability", which allows more frequent and performance-critical operations to be run directly on hardware while complex control and configuration operations are emulated through software. This flexibility enables simpler device hardware designs and can help address limitations associated with direct device assignment such as generational compatibility, live migration, and memory over-commitment. Under the techniques disclosed herein, scalable I/O devices may be composed to reserve hardware resources.

Figure 9:
FIG. 9 is a pseudocode listing for a platform reconfiguration manager action object, according to one embodiment.
Figure 10:
FIG. 10 shows a listing of an interconnect report object, according to one embodiment.

FIG. 9 shows a pseudocode listing 900 for a Platform_Reconfig_Manager_Action object that is sent from the OS/hypervisor to interconnect controller hardware. The Platform_Reconfig_Manager_Action object includes a Message Type, Source ID, Target ID, Priority Class, Arbitration Policy, Resource Allocation Type, Control_signal_modulation, and Monitoring. FIG. 10 shows an Interconnect_Report object 1000 sent by each interconnect hardware to the OS/hypervisor.

It is noted the names and structures of the Platform_Reconfig_Manager_Action object and Interconnect_Report object 1000 are exemplary and non-limiting. Each of these objects may include more, less, and/or different parameters and information.

Figure 11:
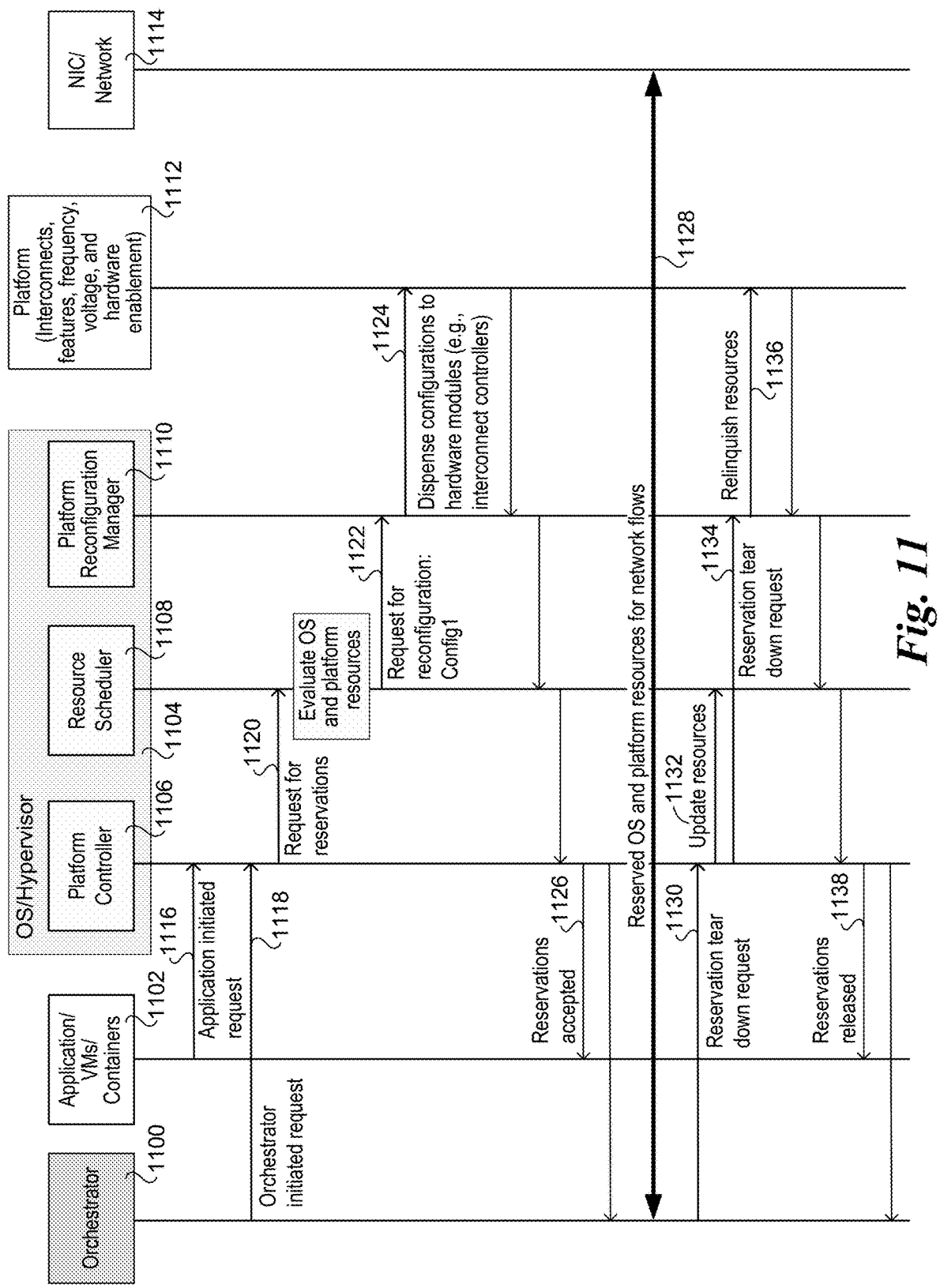
FIG. 11 shows a signal flow diagram for an end-to-end flow mechanism with platform reconfiguration based on application demands.

FIG. 11 shows a signal flow diagram for an end-to-end flow mechanism with platform reconfiguration based on application demands. The components include an orchestrator 1100, Applications/VMs/Containers 1102, OS/hypervisor 1104 including a platform controller 1106, resources scheduler 1108, and platform reconfiguration 1110, platforms 1112, and NIC/network 1114.

The process may be initiated by an application, VM, or container sending a message 1116 to platform controller 1106 or an orchestra initialed request 1118. Upon receipt of message 1116 or 1118, platform controller 1106 send a request for reservation message 1120 to resource scheduler 1108, which evaluates the OS and platform resources. Resource scheduler 1108 sends a request for reconfiguration message 1122 to platform reconfiguration manager 1110, which dispenses configuration messages 1124 to applicable hardware modules, such as interconnect controllers. Upon accepting reservation(s), reservation accepted messages 1126 are forwarded from the platform module(s) to the original requester (orchestrator 1100 or Applications/VMs/Containers 1102).

As shown by the bold double-headed arrow 1128, OS and platform resources are reserved for network flows under the direction of orchestrator 1100. Generally, the reserved resources may be scheduled for use during ongoing operations and for a specific time period. It is also possible to adjust the platform reservations during ongoing operations.

Following a reservation use period, a reservation teardown process is initiated by orchestrator 1110, which sends a reservation tear down request message 1130 to platform controller 1106. In response to receiving a reservation tear down request message 1130, platform controller 1106 send messages 1132 to resources scheduler 1108 to update resources and sends a reservation tear down request 1134 to platform reconfiguration manager 1110. In response to receiving a reservation tear down request 1134, platform reconfiguration manager 1110 sends messages 1136 to applicable platform hardware modules to relinquish resources. Upon relinquishing resources, reservation released message 1138s are forwarded from the platform module(s) to the original requester (orchestrator 1100 or Applications/VMs/Containers 1102).

In addition to reserving and scheduling interconnect resources, processing resources may be reserved and scheduled at both the hardware level and software level. For example, processing resources may include one or more of processor cores, cache, memory, accelerators and/or processing elements in the accelerators. For example, processing resources may be allocated to provided dedicated resources for a given application, VM, or container. This may be done, for instance, by a hypervisor that is used to virtualize physical resources. It may also be performed by a virtualization level for container deployments.

Software level reservation and scheduling may apply to microservices and the like, such as implemented using Kubernetes® and/or Docker®. For instance, a Kubernetes® pod or a Docker® container may be allocated a dedicated level of a core's processing cycles or dedicated cache and/or memory. Other considerations at the software level, such as "noisy neighbor" considerations may be addressed through the resource reservation techniques disclosed herein.

For example, it is common to have multiple tenants lease platform hardware and/or infrastructure from cloud service providers (CSPs) such as Amazon® (e.g., AWS® and other services), Microsoft® (Azure Cloud®) and Google® (Google Cloud®). Under a multi-tenant environment, more than one tenant may share virtualized physical resources, such as compute resources. Since the tenants' applications are executed separately, resources consumed by a given tenant may adversely affect one of more other tenants sharing the resources. Thus, tenants whose applications compete for resources are termed "noisy neighbors."

The teachings and principles disclosed herein may be implemented by a CSP or the like to meet Service Level Agreement (SLA) QoS requirements. For example, an SLA may define minimum levels of workload performance that, under conventional approaches, may be difficult to maintain during high-workload periods due, in part, to inefficient sharing of forwarding and processing resources. Using the approaches described and illustrated herein may enable the CSP to better meet SLA QoS requirements during such high-workload periods and/or in multi-tenant environments to reduce adverse performance affects caused by "noisy neighbors."

Example Platform/System

Figure 12:
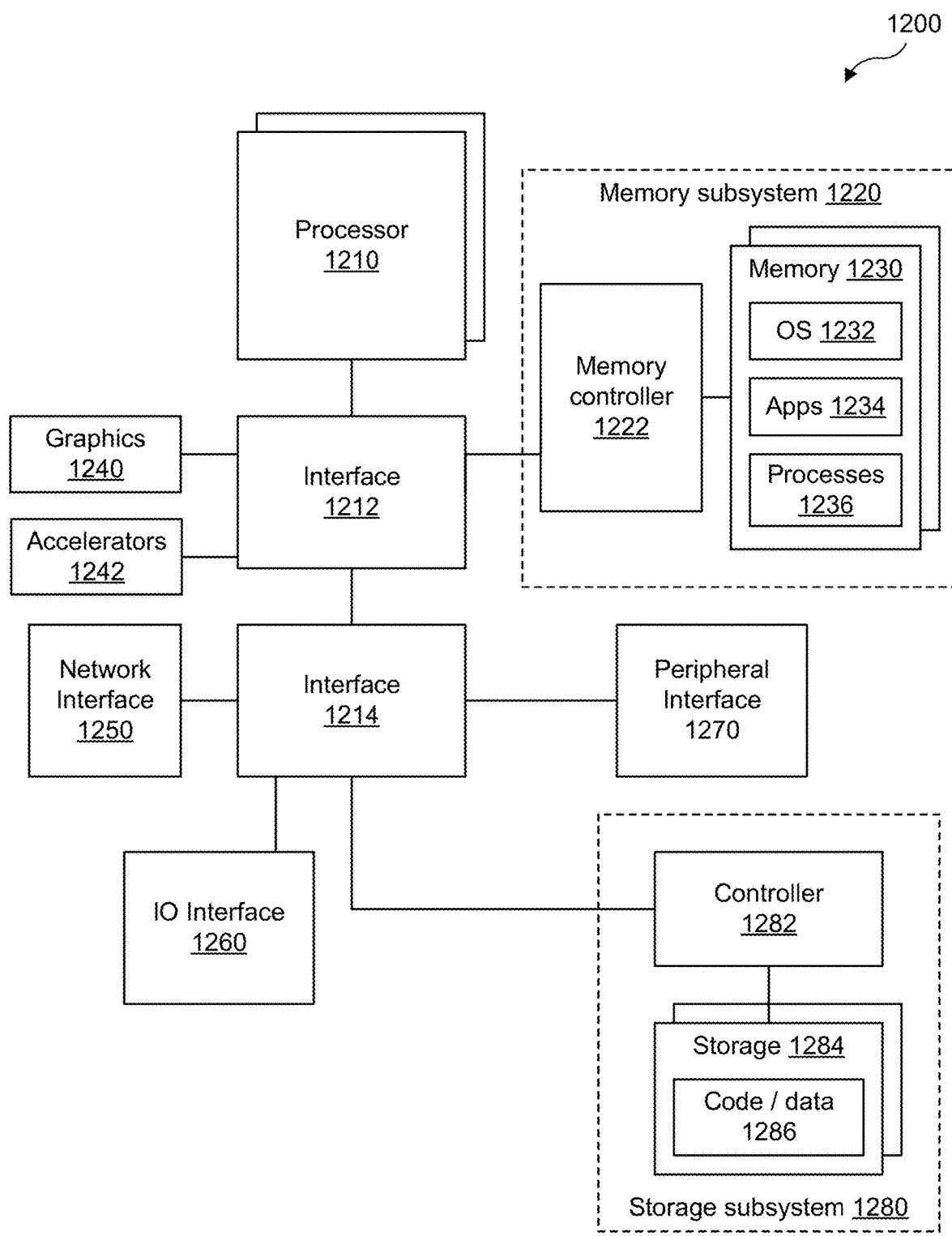
FIG. 12 is a diagram of a platform or system that may be implemented with aspects of the embodiments described and illustrated herein.

FIG. 12 depicts a compute platform or system 1200 in which aspects of the embodiments disclosed above may be implemented. Platform 1200 includes one or more processors 1210, which provides processing, operation management, and execution of instructions for platform 1200. Processor 1210 can include any type of microprocessor, CPU, GPU, processing core, multi-core processor or other processing hardware to provide processing for platform 1200, or a combination of processors. Processor 1210 controls the overall operation of platform 1200, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, platform 1200 includes interface 1212 coupled to processor 1210, which can represent a higher speed interface or a high throughput interface for system components that needs higher bandwidth connections, such as memory subsystem 1220 or optional graphics interface components 1240, or optional accelerators 1242. Interface 1212 represents an interface circuit, which can be a stand-alone component or integrated onto a processor die. Where present, graphics interface 1240 interfaces to graphics components for providing a visual display to a user of platform 1200. In one example, graphics interface 1240 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 1240 generates a display based on data stored in memory 1230 or based on operations executed by processor 1210 or both. In one example, graphics interface 1240 generates a display based on data stored in memory 1230 or based on operations executed by processor 1210 or both.

In some embodiments, accelerators 1242 can be a fixed function offload engine that can be accessed or used by a processor 1210. For example, an accelerator among accelerators 1242 can provide data compression capability, cryptography services such as public key encryption (PKE), cipher, hash/authentication capabilities, decryption, or other capabilities or services. In some embodiments, in addition or alternatively, an accelerator among accelerators 1242 provides field select controller capabilities as described herein. In some cases, accelerators 1242 can be integrated into a CPU socket (e.g., a connector to a motherboard or circuit board that includes a CPU and provides an electrical interface with the CPU). For example, accelerators 1242 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 1242 can provide multiple neural networks, CPUs, processor cores, general purpose graphics processing units, or graphics processing units can be made available for use by AI or ML models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Memory subsystem 1220 represents the main memory of platform 1200 and provides storage for code to be executed by processor 1210, or data values to be used in executing a routine. Memory subsystem 1220 can include one or more memory devices 1230 such as read-only memory (ROM), flash memory, one or more varieties of random access memory (RAM) such as DRAM, or other memory devices, or a combination of such devices. Memory 1230 stores and hosts, among other things, operating system (OS) 1232 to provide a software platform for execution of instructions in platform 1200. Additionally, applications 1234 can execute on the software platform of OS 1232 from memory 1230. Applications 1234 represent programs that have their own operational logic to perform execution of one or more functions. Processes 1236 represent agents or routines that provide auxiliary functions to OS 1232 or one or more applications 1234 or a combination. OS 1232, applications 1234, and processes 1236 provide software logic to provide functions for platform 1200. In one example, memory subsystem 1220 includes memory controller 1222, which is a memory controller to generate and issue commands to memory 1230. It will be understood that memory controller 1222 could be a physical part of processor 1210 or a physical part of interface 1212. For example, memory controller 1222 can be an integrated memory controller, integrated onto a circuit with processor 1210.

While not specifically illustrated, it will be understood that platform 1200 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, platform 1200 includes interface 1214, which can be coupled to interface 1212. In one example, interface 1214 represents an interface circuit, which can include standalone components and integrated circuitry. In one example, multiple user interface components or peripheral components, or both, couple to interface 1214. Network interface 1250 provides platform 1200 the ability to communicate with remote devices (e.g., servers or other computing devices) over one or more networks. Network interface 1250 can include an Ethernet adapter, wireless interconnection components, cellular network interconnection components, USB (universal serial bus), or other wired or wireless standards-based or proprietary interfaces. Network interface 1250 can transmit data to a device that is in the same data center or rack or a remote device, which can include sending data stored in memory. Network interface 1250 can receive data from a remote device, which can include storing received data into memory. Various embodiments can be used in connection with network interface 1250, processor 1210, and memory subsystem 1220.

In one example, platform 1200 includes one or more IO interface(s) 1260. IO interface 1260 can include one or more interface components through which a user interacts with platform 1200 (e.g., audio, alphanumeric, tactile/touch, or other interfacing). Peripheral interface 1270 can include any hardware interface not specifically mentioned above. Peripherals refer generally to devices that connect dependently to platform 1200. A dependent connection is one where platform 1200 provides the software platform or hardware platform or both on which operation executes, and with which a user interacts.

In one example, platform 1200 includes storage subsystem 1280 to store data in a nonvolatile manner. In one example, in certain system implementations, at least certain components of storage 1280 can overlap with components of memory subsystem 1220. Storage subsystem 1280 includes storage device(s) 1284, which can be or include any conventional medium for storing large amounts of data in a nonvolatile manner, such as one or more magnetic, solid state, or optical based disks, or a combination. Storage 1284 holds code or instructions and data 1286 in a persistent state (i.e., the value is retained despite interruption of power to platform 1200). Storage 1284 can be generically considered to be a "memory," although memory 1230 is typically the executing or operating memory to provide instructions to processor 1210. Whereas storage 1284 is nonvolatile, memory 1230 can include volatile memory (i.e., the value or state of the data is indeterminate if power is interrupted to platform 1200). In one example, storage subsystem 1280 includes controller 1282 to interface with storage 1284. In one example controller 1282 is a physical part of interface 1214 or processor 1210 or can include circuits or logic in both processor 1210 and interface 1214.

A volatile memory is memory whose state (and therefore the data stored in it) is indeterminate if power is interrupted to the device. Dynamic volatile memory requires refreshing the data stored in the device to maintain state. One example of dynamic volatile memory includes DRAM, or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/output version 2, JESD229-2 originally published by JEDEC in August 2014), HBM (High Bandwidth Memory, JESD325, originally published by JEDEC in October 2013, LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

A power source (not depicted) provides power to the components of platform 1200. More specifically, power source typically interfaces to one or multiple power supplies in platform 1200 to provide power to the components of platform 1200. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, platform 1200 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), quick UDP Internet Connections (QUIC), RDMA over Converged Ethernet (RoCE), Peripheral Component Interconnect express (PCIe), Intel® QuickPath Interconnect (QPI), Intel® Ultra Path Interconnect (UPI), IOSF, Omnipath, Compute Express Link (CXL), HyperTransport, high-speed fabric, NVLink, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof. Data can be copied or stored to virtualized storage nodes using a protocol such as NVMe over Fabrics (NVMe-oF) or NVMe.

Compute platform 1200 may be implemented using various configurations, such as but not limited to a stand-alone server or computing system, a 1U, 2U, or 4U server installed in a rack, a blade server or server module installed in a chassis, drawer, sled, or tray, etc.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method implemented on a compute platform hosting a virtual machine or container running one or more applications and including hardware resources comprising a plurality of interconnected processing units interconnected via direct interconnects and a network interface having an Input/Output (I/O) interface coupled directly to a mating I/O interface on one of the plurality of interconnected processing units, comprising:
   reserving, per an application, VM, or container, at least a first portion of hardware resources that are traversed by a flow path used when forwarding data received at the network interface to the application, VM, or container, the at least a first portion of hardware resources being along a portion of the flow path between the I/O interface on the network interface and at least one interconnected processing unit; and
   forwarding data received at the network interface via the flow path to the application, VM, or container using the at least a first portion of hardware resources that are reserved.

2. The method of claim 1, wherein the processing units include processing resources, and wherein in connection with forwarding data destined for the application, VM, or container from the network interface processing operations are performed on the data using processing resources, further comprising:
   reserving, per the application, VM, or container, at least one processing resource; and
   employing the reserved at least one processing resource for processing data received at the network interface and forwarded via the flow path to the application, VM, or container.

3. The method of claim 1, wherein the portion of the flow path between the I/O interface on the network interface and the at least one interconnected processing unit traverses one or more chip-to-chip interconnects, further comprising reserving use of at least one chip-to-chip interconnect among the one or more chip-to-chip interconnects for data forwarded to the application, VM, or container via the flow path.

4. The method of claim 1 wherein a processing unit includes first and second dies interconnected via a die-to-die interconnect that is traversed by the portion of the flow path between the I/O interface on the network interface and the at least one interconnected processing unit, further comprising reserving use of the die-to-die interconnect for data forwarded to the application, VM, or container via the flow path.

5. The method of claim 1, wherein the one or more processing units comprise first and second sockets interconnected by a socket-to-socket interconnect that is traversed by the portion of the flow path between the I/O interface on the network interface and the at least one interconnected processing unit, further comprising reserving use of the socket-to-socket interconnect for data forwarded to the application, VM, or container via the flow path.

6. The method of claim 1, wherein the compute platform further hosts an operating system (OS) and a hypervisor, further comprising reserving per the application, VM, or container, at least one of OS and hypervisor resources utilized by the OS and the hypervisor.

7. The method of claim 1, wherein the one or more processing units comprises a processing unit with an on-chip fabric that is traversed by the portion of the flow path between the I/O interface on the network interface and the at least one interconnected processing unit, further comprising reserving use of the on-chip fabric for forwarding data to the application, VM, or container via the flow path.

8. The method of claim 1, further comprising:
   reserving, per an application, VM, or container, at least a second portion of hardware resources that are traversed by a second flow path used when forwarding data originating from the application, VM, or container to the network interface; and
   forwarding data originating from the application, VM, or container to the network interface via the second flow path utilizing the at least a second portion of hardware resources that are reserved.

9. The method of claim 1, wherein a latency for a flow path associated with the application, VM, or container has a non-deterministic latency when not utilizing reserved hardware resources for the flow path and has a deterministic latency when utilizing reserved hardware resources for the flow path.

10. A compute platform, comprising:
hardware resources including,
a processor System on a Chip (SoC) having a plurality of processing resources interconnected via on-chip interconnects;
a network interface controller (NIC) communicatively coupled to the processor SoC via a direct interconnect coupled between an Input/Output (I/O) interface on the NIC and a mating I/O interface on the processor SoC; and
software, comprising instructions configured to be executed on the plurality of processing resources, the software including an operating system, a first virtual machine (VM) hosting a plurality of applications or a first container in which at least one application is run, a resource scheduler, and a platform reconfiguration manager,
wherein execution of the software enables the compute platform to:
reserve, per an application, VM, or container, at least a first portion of hardware resources that are traversed by a flow path used when forwarding packets received at the NIC to the application, VM, or container, the at least a first portion of hardware resources being along a portion of the flow path between the I/O interface on the NIC and at least one interconnected processing resource; and
forward data received at the NIC via the flow path to the application, VM, or container using the at least a first portion of hardware resources that are reserved per the application, VM, or container.

11. The compute platform of claim 10, wherein in connection with forwarding data destined for the application, VM, or container from the NIC processing operations are performed on the data using processing resources, wherein execution of the software further enables the platform to:
reserve, per the application, VM, or container, at least one processing resource; and
employ the reserved at least one processing resource for processing data received at the NIC and forwarded via the flow path to the application, VM, or container.

12. The compute platform of claim 10, wherein the portion of the flow path between the I/O interface on the NIC flow path traverses one or more chip-to-chip interconnects, wherein execution of the software further enables the compute platform to reserve use of at least one chip-to-chip interconnect among the one or more chip-to-chip interconnects for data forwarded to the application, VM, or container via the flow path.

13. The compute platform of claim 10, wherein the OS and hypervisor utilize OS and hypervisor resources, and wherein execution of the software further enables the compute platform to reserve per the application, VM, or container, at least one of OS and hypervisor resources utilized by the OS and the hypervisor.

14. The compute platform of claim 10, wherein execution of the software further enables the compute platform to:
reserve, per an application, VM, or container, at least a second portion of hardware resources that are traversed by a second flow path used when forwarding data originating from the application, VM, or container to the NIC; and
forward data originating from the application, VM, or container to the NIC via the second flow path utilizing the at least a second portion of hardware resources that are reserved.

15. A non-transitory machine-readable medium having instructions stored thereon configured to be executed on one of more processing units in a compute platform while the compute platform is hosting a virtual machine or container running one or more applications and including hardware resources comprising a plurality of interconnected processing units interconnected via direct interconnects and a network interface having an Input/Output (I/O) interface coupled directly to a mating I/O interface on one of the plurality of interconnected processing units, wherein execution of the instructions enables the compute platform to:
receive, for an application, VM, or container, a resource reservation request for at least a first portion of hardware resources that are traversed by a flow path used when forwarding data from the I/O interface on the network interface to the application, VM, or container;
reserve, for the application, VM, or container, the at least first portion of hardware resources that are traversed by the flow path; and
configure the at least first portion of hardware resources to enable data received at the network interface to be forwarded to the application, VM, or container via the flow path to have a deterministic latency.

16. The non-transitory machine-readable medium of claim 15, wherein the instructions comprise at least one of an operating system and a hypervisor.

17. The non-transitory machine-readable medium of claim 16, wherein the at least one of the operating system and hypervisor is configured to receive resource reservation requests from an orchestrator running on the compute platform or running on a second computer platform communicatively-coupled to the compute platform.

18. The non-transitory machine-readable medium of claim 16, wherein the resources reservation request includes at least one request for reserving processor resources used to execute software associated with the application, VM, or container.

19. The non-transitory machine-readable medium of claim 16, wherein the compute platform is implemented in a data center and the at least one of the operating system and hypervisor is configured to reserve and configure hardware resources to meet a Quality of Service (QOS) level in accordance with a Service Level Agreement.

* * * * *

UNITED STATES PATENT AND TRADEMARK OFFICE
CERTIFICATE OF CORRECTION

PATENT NO. : 12,483,515 B2
APPLICATION NO. : 17/179249
DATED : November 25, 2025
INVENTOR(S) : Akhilesh S. Thyagaturu et al.

It is certified that error appears in the above-identified patent and that said Letters Patent is hereby corrected as shown below:

In the Claims

Claim 19 should read:
The non-transitory machine-readable medium of claim 16, wherein the compute platform is implemented in a data center and the at least one of the operating system and hypervisor is configured to reserve and configure hardware resources to meet a Quality of Service (QoS) level in accordance with a Service Level Agreement.

Signed and Sealed this
Thirteenth Day of January, 2026

John A. Squires
*Director of the United States Patent and Trademark Office*